F. Nishwitz.
Harvester.

No. 73826. Patented Jan. 28, 1868.

Inventor
F. Nishwitz
by his Atty
Baldwin

F. Nishwitz.
Harvester.
N° 73,826. Patented Jan. 28, 1868.
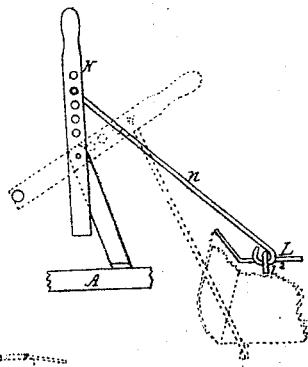
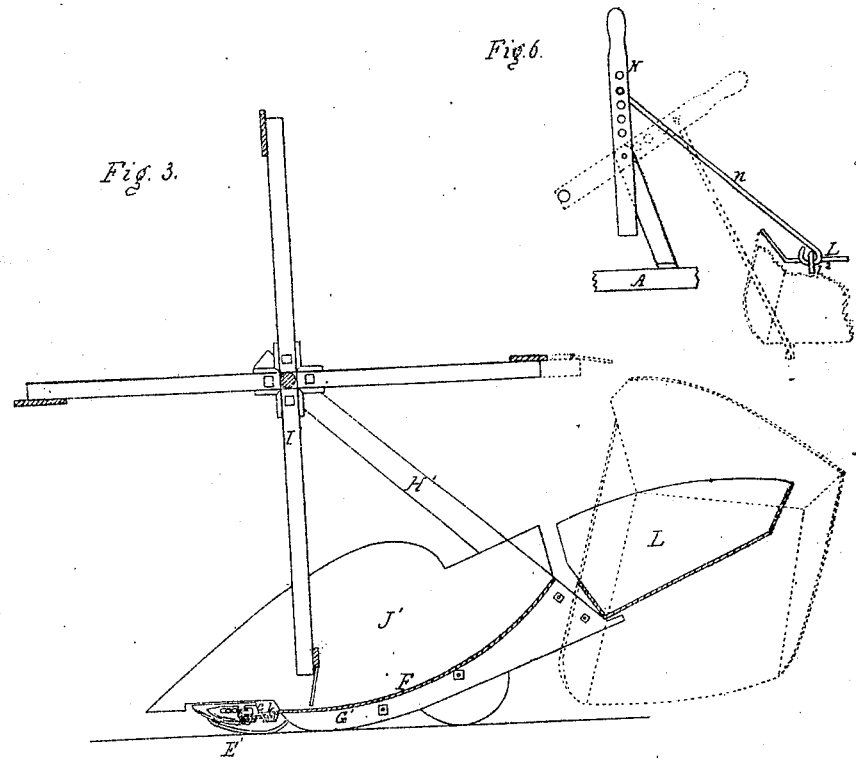
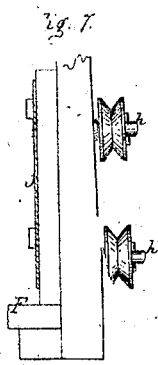
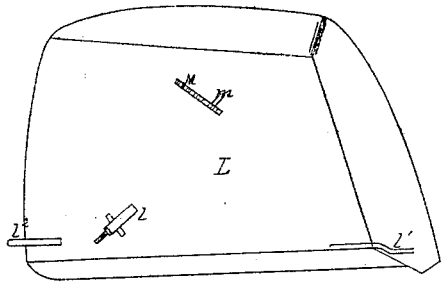
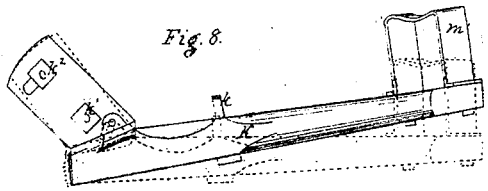
Witnesses:
Inventor,

United States Patent Office.

FREDERICK NISHWITZ, OF BROOKLYN, NEW YORK.

Letters Patent No. 73,826, dated January 28, 1868.

---

IMPROVEMENT IN HARVESTERS.

---

The Schedule referred to in these Letters Patent and making part of the same.

---

TO ALL WHOM IT MAY CONCERN:

Be it known that I, FREDERICK NISHWITZ, of Brooklyn, in the county of Kings, and State of New York, have invented certain new and useful Improvements in Harvesters, of which the following is a full, clear, and exact description, reference being had to the accompanying drawings, which make part of this specification, and in which—

Figure 3 is a vertical longitudinal section through the line $x\ x$ of fig. 1, the position of the dumping-box, when tilted, being shown in red lines.

Figure 4 is a view of the under side of the dumping-box.

Figure 6 is a view showing in detail the apparatus for tilting the dumping-box, the red lines showing the relative position of the respective parts when tilted.

Figure 7 is a view of the inner post and reel pulleys; and

Figure 8 is a view showing the mode of adjusting the supporting-arm, which carries the dumping-box, in order to vary the inclination of the latter.

My invention relates to that class of harvesters in which the cut grain is swept off the platform on which it falls as it is cut, by brushes, teeth, or ribs on one or more of the reel-blades or beaters; and the object of my improvements is to deliver the grain in gavels suitable for binding, out of the way of the team in cutting the next swath.

To this end the improvements herein claimed consist, first, in a dumping-box mounted on a rolling fulcrum, and tipping diagonally to the path of the machine; second, in combining a curved or concave platform with a diagonally-tilting dumping-box; third, in combining a reel-rake and a curved or concave platform with a diagonally-tilting dumping-box; fourth, in combining a reel-rake with a tilting dumping-box; fifth, in combining with a dumping-box tilting diagonally to the path of the machine, a tilting-lever, operated by either the hand or foot of the driver, or by both combined; sixth, in a device for maintaining the dumping-box in proper position while tilting or rolling on its fulcrum or support; seventh, in a device for varying the angle of inclination of the dumping-box with respect to the platform.

In the accompanying drawings, (which exemplify one convenient mode of carrying out the objects of my invention,) my improvement is shown as applied to a two-wheeled, side-draught, front-cut mowing-machine, known as the "Monitor Mower," and described in Letters Patent of the United States, numbered 46,488, granted to me, February 21, 1865, for improvement in harvesters. It is obvious, however, that the invention herein claimed might be modified in various ways, and adapted to other machines without departing from the spirit of my improvements.

Figure 5:
Figure 5 is a view, in detail, of the rolling fulcrum of the dumping-box, with its supporting-arm and guide.

In this instance, the main frame A is supported upon two main driving-wheels, B, which drive the cutters through proper gearing. A tongue, C, projects from the front of the frame, and a driver's seat, D, is mounted upon the rear of the frame. A finger-beam, E, is hinged to the front inner corner of the main frame, in such manner as to permit it freely to conform to the undulations of the ground over which it is drawn. A concave platform, F, which I prefer to have curved in the arc of a circle, of which the reel-shaft forms the centre, is attached to a frame, consisting of two side-pieces, G G', upon which, in this instance, the reel-posts or standards H H' carrying a reel, I, are mounted, the inner post, H, being mounted on the front of the frame, while the one on the grain-side is mounted upon the rear of the frame. It is obvious, however, that an overhung reel might be used, if preferred, that is, one supported at the inner end only. I prefer to make the arms of this reel longer than is usual, so that they may the better reach and bring back to the cutters leaning grain; and I suspend the reel at a proportionately greater height above the platform. A small grain-wheel supports the divider-end of the platform. The platform is provided with suitable dividers and grain-guards, J J', at each end. An arm, K, attached to and projecting diagonally behind the inner rear corner of this frame, supports a tilting dumping-box or platform, L, provided with a pin, $l$, which enters an eye, $k$, on the arm K, and thus forms a pivot on which the dumping-box L turns. A pin, $l'$, fig. 4, on the front outer corner of this box, rests upon the frame-piece G' when the dumping-box is horizontal, and supports that end of the dumping-box. A sector or rolling fulcrum, M, on the under side of the dumping-box, is provided with teeth, which, as the dumping-box is tilted, successively enter a row of holes in the supporting-arm K, in order to allow of the necessary tilting motion, and at the same time prevent the slipping of the dumping-box. A pin, $m$, on the sector M, travels in a guide, $m'$, on the supporting-arm K, (see fig. 5,) and still further serves to hold the sector and dumping-box in their proper positions relatively to the platform F.

Figure 1:
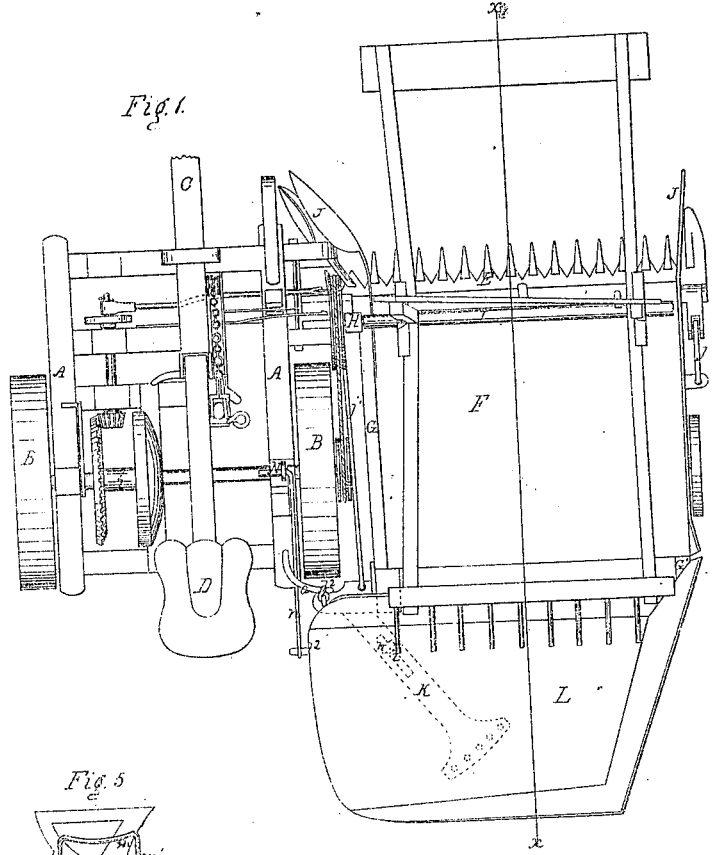
Figure 1 represents a plan or top view of a harvester embracing my improvements, the diagonal arm, to support one end of the dumping-box, being shown in dotted lines.

The platform, frame, and dumping-box above described, can readily be attached to or removed from the machine, being provided, for that purpose, with bifurcated lugs $b$, fig. 3, which slip on the finger-beam and hold the frame securely. A hook and staple, $j$, or other suitable fastening, holds the divider-side of the frame secure, while the gearing-side is secured by a link, $j^1$, which is attached to the finger-beam in front, and hooks into the arm K in the rear, (see fig. 1.) The inner rear corner of the platform-frame is sustained by a chain, $j^2$, hooked into a standard, $a$, on the inner rear corner of the main frame. The dumping-box extends across the whole width of the platform, and extends somewhat beyond it on the gearing-side. It is tilted by means of a link, $n$, pivoted at one end to a hook, $l^2$, or other suitable connection on its inner front corner, and at its other to a rocking-lever, N, pivoted upon the frame, and so constructed as to be operated either by the hand or foot of the driver, (see fig. 6.) The reel is driven by a band encircling a pulley on the main axle, and passing over pulleys $h\ h'$ on the reel-post before encircling the pulley on the reel-shaft. The arm K (see fig. 8) is supported on a pivot, $k^1$, on which it turns, being held in any desired position by the slot and set-screw $k^2$. The raising or lowering of the outer end of this arm correspondingly varies the inclination of the dumping-box.

Figure 2:
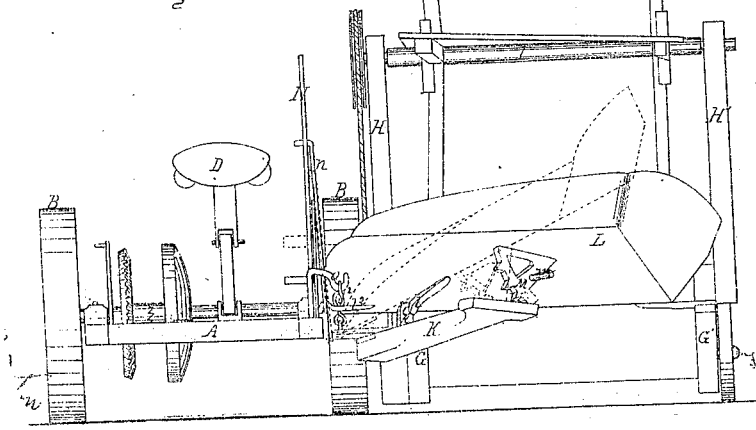
Figure 2 represents a view, in elevation, of the same, as seen from the rear, the red lines showing the dumping-box, partially tilted, to discharge the gavel.

The operation of the machine is as follows: As the machine advances, the standing grain is swept back by the reel, severed by the cutting-apparatus, and falls upon the platform. When the arm I', carrying the rake-teeth, comes round, the gavel which has accumulated upon the platform is swept backwards, head foremost, over the concave platform F, into the dumping-box L. When a gavel of proper size has accumulated in the dumping-box, the driver tilts the dumping-box by moving the rocking-lever N backwards into the position shown by the red lines in fig. 6, thus causing the dumping-box to roll over upon its pivots M and $l$, by depressing its inner front corner, until it assumes the position shown in red in figs. 2, 3, and 6. As the dumping-box turns on its pivots M and $l$, the gavel is dropped upon the ground, in the track of the inner driving-wheel, in a compact bundle, where it is out of the path of the horses in cutting the next swath. When released by the driver, the dumping-box resumes its original position, and the above-described operation is repeated. Several gavels may be allowed to accumulate in the box before being dumped, if desired. The peculiar manner in which the box is tilted causes the gavel to roll or turn over in falling, and thus forms a compact bundle, and prevents scattering. By reference to fig. 3, it will be seen that owing to the diagonal arrangement of its pivots, the dumping-box can be tilted without coming in contact with the reel-ribs, as it rolls away from the reel in tilting.

What I claim herein as my invention, and desire to secure by Letters Patent, is—

1. A dumping-box tilting diagonally on a rolling fulcrum, substantially in the manner and for the purpose described.

2. The combination of a concave platform with a diagonally-tilting dumping-box, substantially as described.

3. The combination of a reel-rake, a concave platform, and a diagonally-tilting dumping-box, substantially as described.

4. The combination of a reel-rake with a dumping-box, tilting diagonally to the reel-shaft, substantially as described.

5. The combination, with the tilting dumping-box, of the tilting-lever, operated either by the hand or foot of the driver, or by both combined, substantially as described.

6. The combination of the projecting supporting-arm K with the tilting-platform or dumping-box, rolling fulcrum, and retaining-guide, substantially as described.

7. The adjustable supporting-arm K, constructed and arranged as described.

In testimony whereof, I have hereunto subscribed my name.

F. NISHWITZ.

Witnesses:
   HENRY A. LEE,
   C. H. TIEBOUT.